United States Patent
Ballou et al.

(10) Patent No.: US 8,794,492 B2
(45) Date of Patent: Aug. 5, 2014

(54) ARTICLE-STORAGE UNIT

(75) Inventors: Daniel Ballou, Long Beach, CA (US); Ryan Redenbaugh, Huntington Beach, CA (US)

(73) Assignee: Cosco Management, Wilmington, DE (US)

( * ) Notice: Subject to any disclaimer, the term of this patent is extended or adjusted under 35 U.S.C. 154(b) by 154 days.

(21) Appl. No.: 13/443,569

(22) Filed: Apr. 10, 2012

(65) Prior Publication Data

US 2013/0264363 A1 Oct. 10, 2013

(51) Int. Cl.
- *B65D 37/00* (2006.01)
- *B60R 11/00* (2006.01)
- *B65D 25/04* (2006.01)
- *A45C 13/02* (2006.01)

(52) U.S. Cl.
CPC .............. *B60R 11/00* (2013.01); *B65D 25/04* (2013.01); *A45C 13/02* (2013.01)
USPC .......................... 224/42.34; 224/539; 224/557

(58) Field of Classification Search
CPC .......... B65D 37/00; B65D 25/04; B60R 7/02; B60R 11/00; A45C 3/00; A45C 13/02
USPC .............. 224/42.34, 545, 549, 585, 539, 557, 224/0.5, 403, 404; 220/9.2, 9.3, 530, 529, 220/6, 592.26, 592.2
See application file for complete search history.

(56) References Cited

U.S. PATENT DOCUMENTS

| | | | |
|---|---|---|---|
| 3,357,614 A * | 12/1967 | Berg | 224/540 |
| 4,506,769 A * | 3/1985 | Franco et al. | 190/108 |
| 5,007,569 A | 4/1991 | Zarb | |
| 5,390,887 A * | 2/1995 | Campbell | 248/311.2 |
| 5,498,049 A * | 3/1996 | Schlachter | 296/37.6 |
| 5,680,973 A | 10/1997 | Vulpitta et al. | |
| 6,000,753 A | 12/1999 | Cone, II | |
| 6,056,177 A * | 5/2000 | Schneider | 224/401 |
| 6,082,804 A * | 7/2000 | Schlachter | 296/37.6 |
| 6,142,574 A | 11/2000 | Alexander | |
| 6,155,637 A | 12/2000 | Waters | |
| 6,375,054 B1 * | 4/2002 | Lance et al. | 224/404 |
| 6,412,142 B1 * | 7/2002 | Iverson | 16/4 |
| 6,422,440 B1 | 7/2002 | Stone | |
| 6,732,863 B2 * | 5/2004 | Speck | 206/315.9 |
| 6,860,557 B2 | 3/2005 | Jonasson | |
| 7,665,642 B2 | 2/2010 | Abbate | |
| 2002/0144916 A1 * | 10/2002 | Cheng | 206/315.1 |
| 2005/0176508 A1 | 8/2005 | Chastain | |
| 2005/0200169 A1 | 9/2005 | Tipton | |
| 2006/0049674 A1 | 3/2006 | Fair | |
| 2008/0308591 A1 * | 12/2008 | Henderson et al. | 224/404 |
| 2009/0255967 A1 * | 10/2009 | Lueder | 224/404 |
| 2010/0264180 A1 * | 10/2010 | Allotey | 224/404 |
| 2011/0121046 A1 * | 5/2011 | Dexter | 224/581 |
| 2011/0168598 A1 * | 7/2011 | Rees et al. | 206/505 |

* cited by examiner

*Primary Examiner* — Adam Waggenspack
(74) *Attorney, Agent, or Firm* — Barnes & Thornburg LLP (57) ABSTRACT

An article-storage unit is configured to store various articles in several compartments. The article-storage unit is compactable to assume a smaller size when not in use.

41 Claims, 10 Drawing Sheets

ARTICLE-STORAGE UNIT

BACKGROUND

The present disclosure relates to an article-storage unit, and particularly to a multi-compartment article-storage unit. More particularly, the present disclosure relates to a compactable article-storage unit for storing personal items.

SUMMARY

An article-storage unit in accordance with the present disclosure includes a tray formed to include an interior storage region. The tray includes a floor and a side wall coupled to a perimeter edge of the floor.

In illustrative embodiments, the article-storage unit further includes a detachable tray organizer that can, at the option of the consumer, be coupled to the tray to partition the interior storage region. The tray is made of a pliable material and, once the consumer detaches the tray organizer from the tray, the consumer can fold the tray to assume a smaller size that can be stored in a small space until it is needed later. A manufacturer can also fold the tray to form a compact unit that can be packaged in a small box at retail.

In illustrative embodiments, the tray organizer includes a partition wall, a front lid pivotably coupled to a top edge of the partition wall, and a rear divider panel coupled to a rear side of the partition wall. A consumer can mount the tray organizer in the interior storage region of the tray in the field to establish a front chamber and to establish a separate rear chamber divided by the rear divider panel into two side-by-side compartments and to orient the front lid so it can be moved to cover the front chamber. The article-storage unit also includes a rear lid that is movable to close the two compartments in the rear chamber and one or more front divider panels for dividing the front chamber into two or more compartments.

In illustrative embodiments, the floor of the tray carries a floor anchor that can be operated by a consumer to anchor the tray to an underlayment such as a pad or a carpet in the trunk of a vehicle. The floor anchor includes a piercing member that can be rotated about a vertical axis manually by a co to pierce an outer surface of the underlayment to retain the tray temporarily in a stationary position on the underlayment. The consumer can retract the piercing member from the underlayment by rotating the piercing member about the vertical axis in an opposite direction so that the tray can be folded easily to assume a stowable compact shape when the article-storage unit is not in use.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 2 and 3 show that each of the lids can be opened independently without moving the other lid relative to the tray away from a closed position;

FIG. 4 is an enlarged exploded perspective view of components that are made in accordance with the present disclosure to be (1) assembled by a consumer in the field to produce an erected article-storage unit shown in FIGS. 1 and 5 and (2) disassembled by the consumer in the field to produce a compacted article-storage unit ready to be stored until its next use and showing that the article-storage unit comprises a container including a tray formed to include an interior storage region and a rear lid coupled to a rear wall of the tray for pivotable movement about a rear-lid pivot axis, a detachable tray organizer including a vertical partition wall, a forwardly extending front lid coupled to the partition wall for pivotable movement about a front-lid pivot axis, and a rearwardly extending rear divider panel coupled to the partition wall and arranged to extend in a rearward direction, a pair of front divider panels arranged to be coupled to the partition wall of the tray organizer and the front wall of the tray, and one of the four floor anchors coupled to the floor of the tray and configured to pierce a surface of an underlayment (e.g., vehicle trunk carpet) underlying the tray floor to anchor the article-storage unit temporarily to that surface;

FIGS. 8-11 shown an illustrative process for folding the article-storage unit in accordance with the present disclosure to convert the unit from the erected use mode shown in FIGS. 1-3 to a most compact mode shown in FIG. 11;

DETAILED DESCRIPTION

An article-storage unit 10 includes a tray 12, a detachable tray organizer 14 including a partition wall 16, a front lid 18, and a rear divider panel 20, and a rear lid 22 as shown, for example, in FIGS. 1-4. Tray 12 and rear lid 22 cooperate to form a container 13 that is shown, for example, in FIGS. 1 and 4. Container 13 is made of pliable material in an illustrative embodiment so that it can be folded as suggested in FIGS. 8-11 when not in use.

Figure 13:
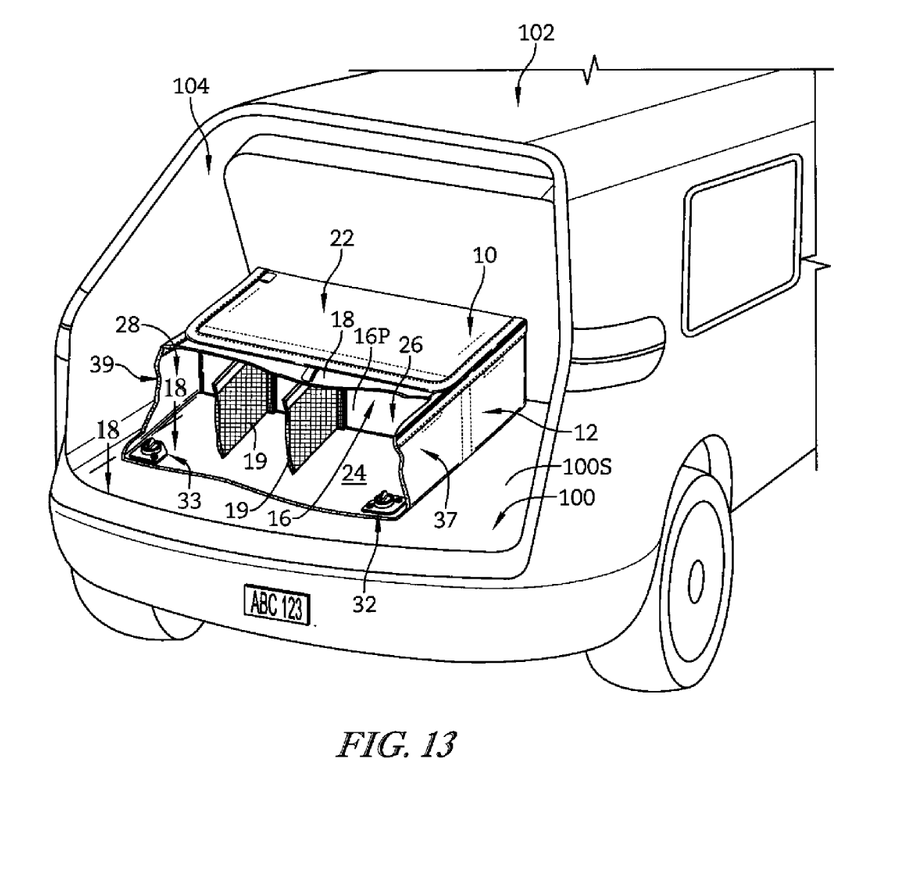
FIG. 13 is a perspective view showing an article-storage unit in accordance with the present disclosure, with portions broken away to show two floor anchors coupled to opposite corner portions of the floor of the collapsible tray and configured to engage an underlying trunk pad or carpet to fix the article-storage unit in a stationary position on an underlying surface in a vehicle or other support platform.
Figure 14:
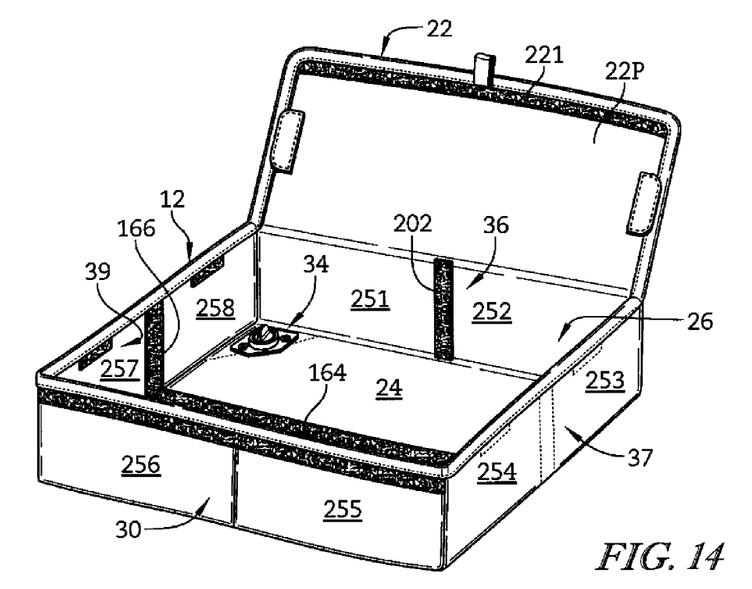
FIG. 14 is a view of an article-storage unit in accordance with the present disclosure showing an empty interior storage region and one of the floor anchors coupled to one of the rear corner portions of the floor of the collapsible tray.
Figure 15:
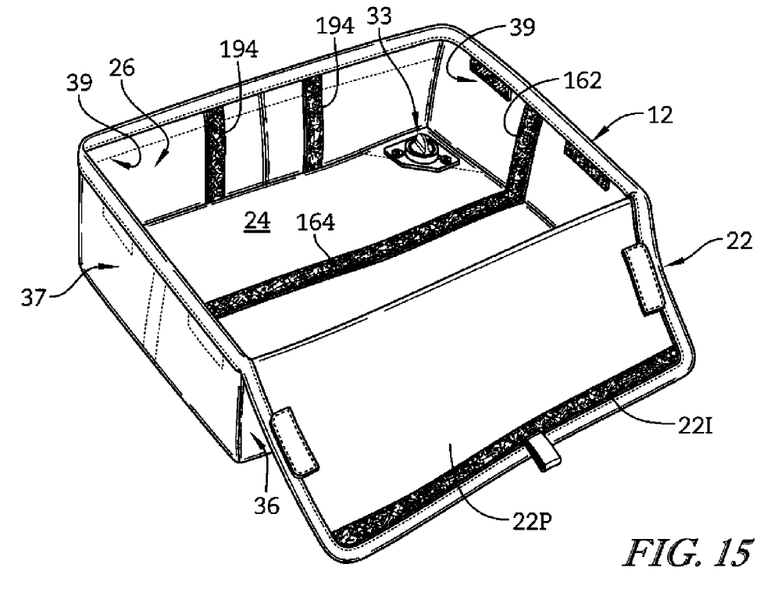
FIG. 15 is another view of the portion of the article-storage unit shown in FIG. 14 showing another of the floor anchors couple to one of the front corner portions of the floor of the collapsible tray.

Article-storage unit 10 also includes anchor means 30 coupled to a floor 24 of tray 12 for piercing a surface 100S of an underlayment 100 included in a vehicle 102 or other device at the option of a consumer to retain tray 12 in a stationary position on underlayment 100 as suggested in FIGS. 13-19 so that article-storage unit 10 remains in a stationary position in, for example, the rear-storage area 104 in a mini-van or other vehicle during motion of that mini-van as shown in FIG. 13. Anchor means 30 includes four floor anchors 31-34 as shown, for example, in FIGS. 5, 14, and 15.

Figures 1, 2, 3:
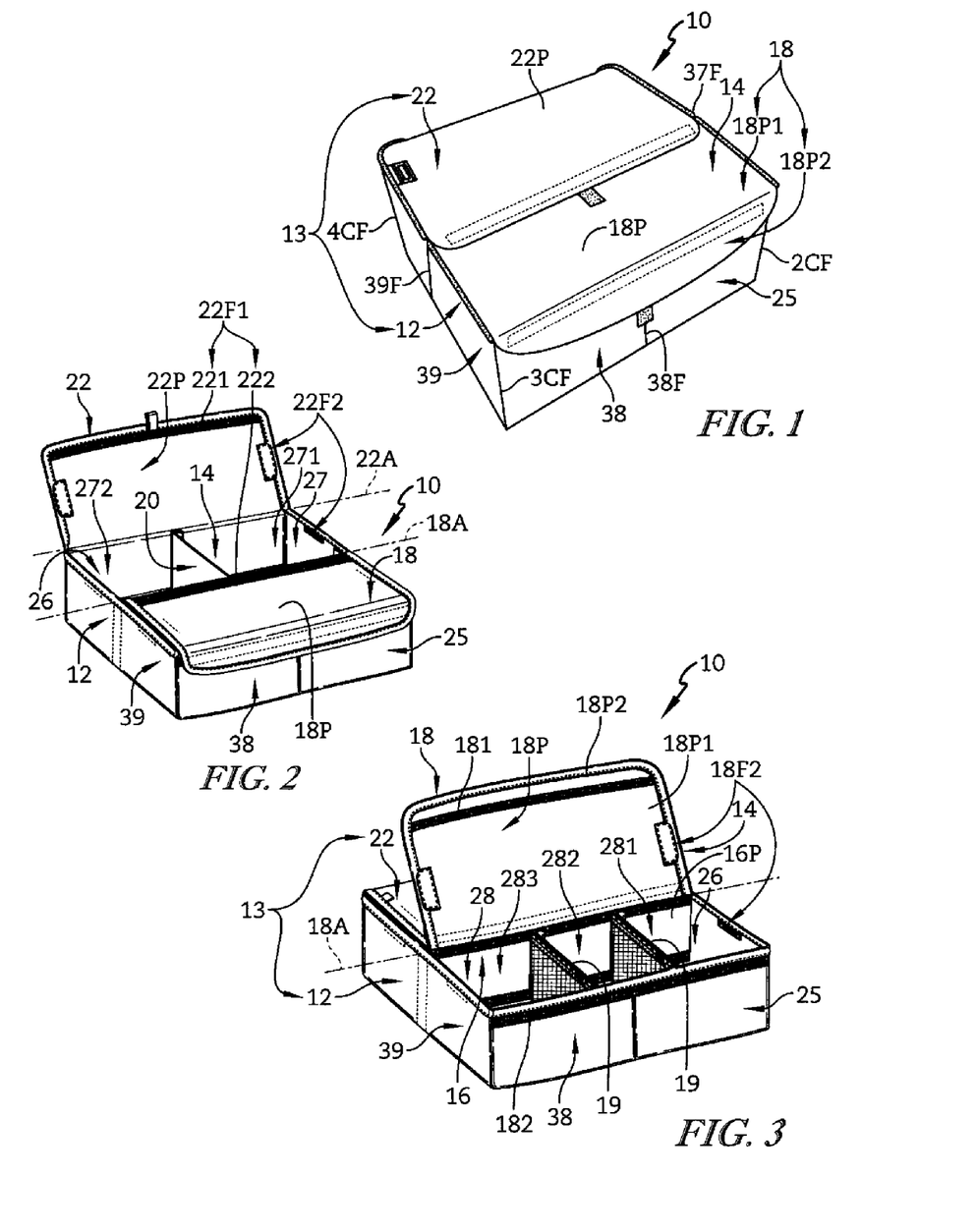
FIG. 1 is a perspective view of an article-storage unit in accordance with the present disclosure that can be folded by a consumer (when not in use) or a manufacturer in an illustrative manner shown in FIGS. 8-11 and showing that a front lid has been moved to a closed position covering a front chamber formed in a tray and mating with an outer surface of a front wall of the tray and that a rear lid has been moved to a closed position covering a rear chamber formed in the tray and mating with a rear portion of a topside of the front lid and also showing two pull tabs associated with the front and rear lids and arranged to be gripped and pulled upwardly by a consumer to facilitate opening of a selected lid.
FIG. 2 is a perspective view similar to FIG. 1 showing that the rear lid has been moved about a rear-lid pivot axis provided along a top edge of a rear wall of the tray to an opened position to expose two compartments provided in the rear chamber without disturbing the closed position of the front lid.
FIG. 3 is a view similar to FIG. 2 showing that the front lid has been moved to an opened position about a front-lid pivot axis provided along a top edge of a detachable partition wall that has been placed by a consumer in the field (as suggested in FIGS. 4 and 5) into an interior storage region formed in the tray to partition that region to form the front and rear chamber and showing that the front lid was moved to the opened position to expose three compartments provided in the front chamber without disturbing the closed position of the rear lid.
Figure 4:
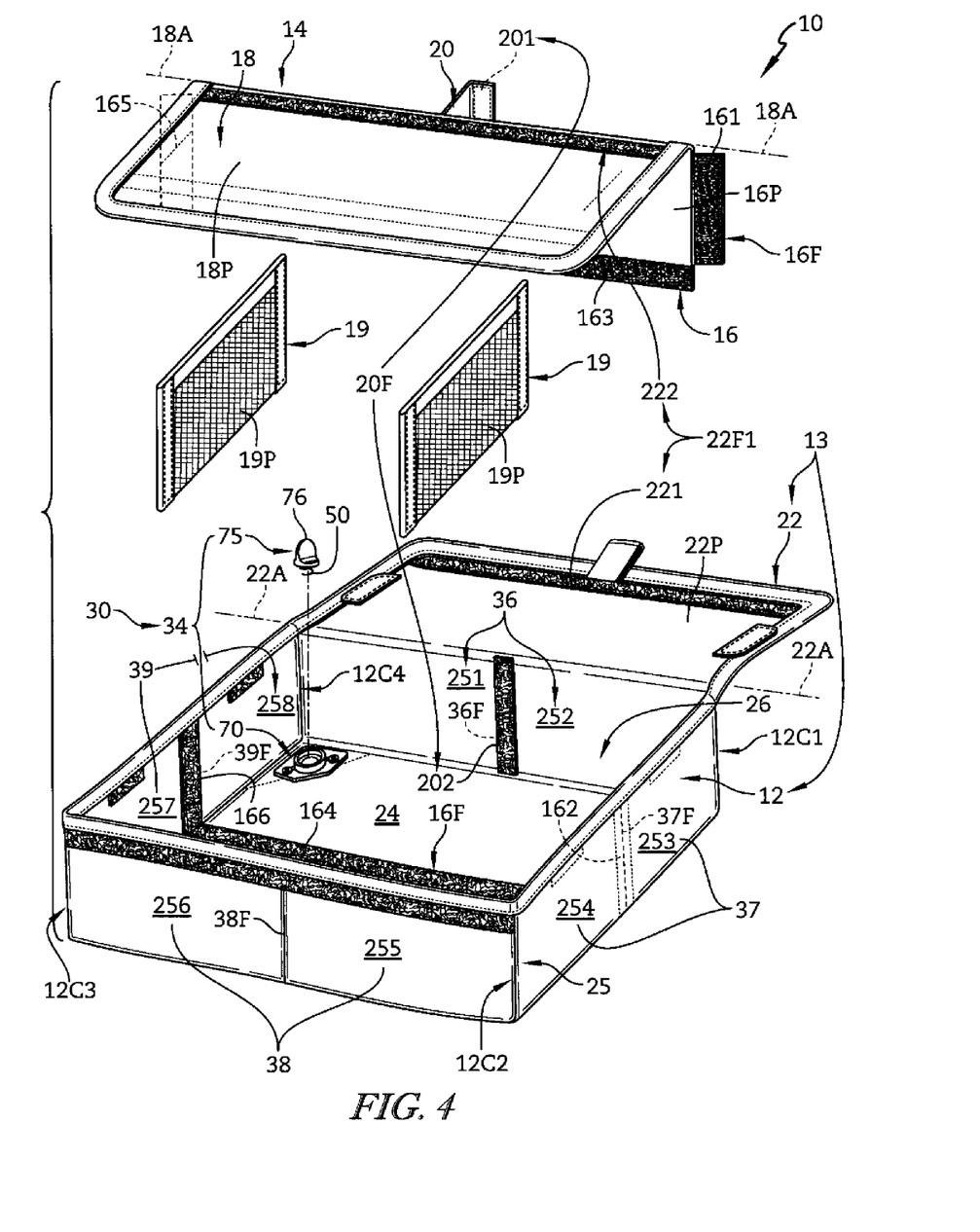
Figure 5:
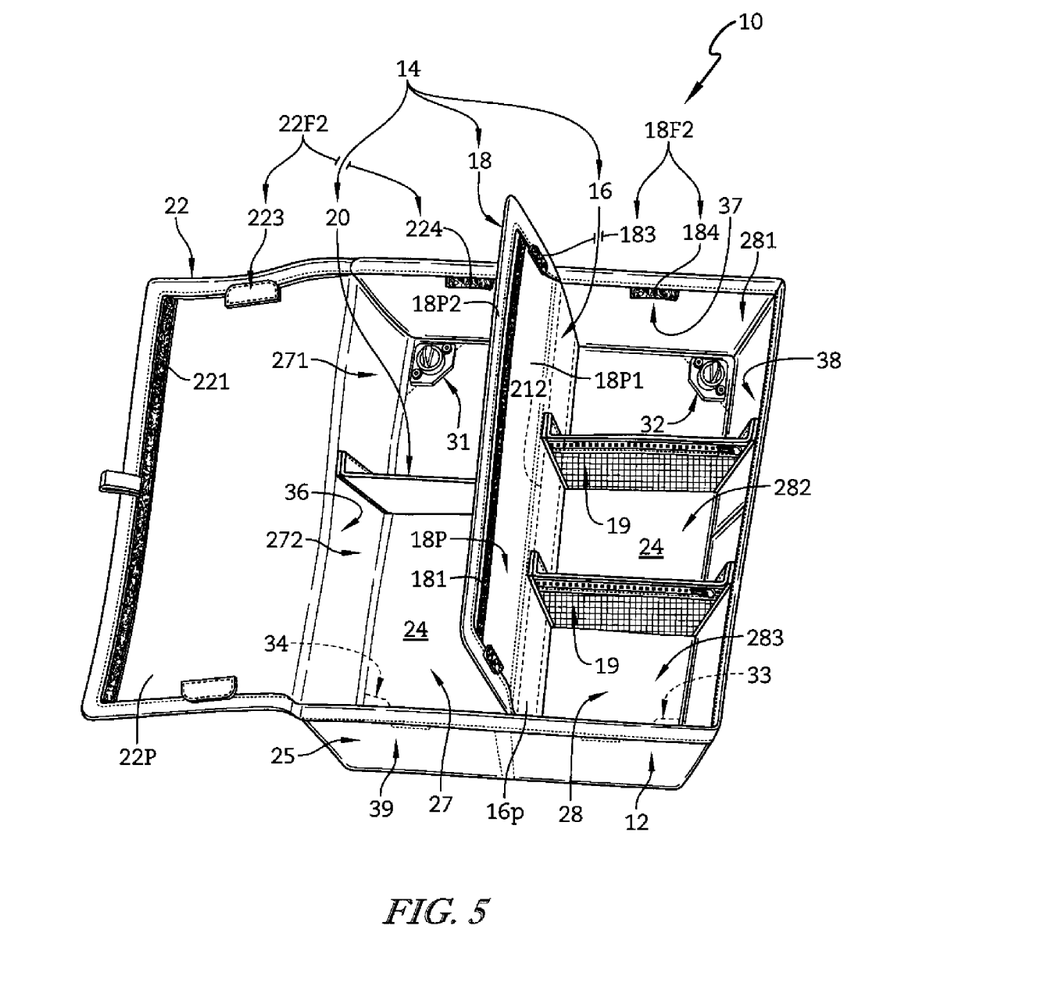
FIG. 5 is a top perspective view of an article-storage unit in accordance with the present disclosure after assembly of the components shown in FIG. 4 by a consumer in the field showing each of the rear and front lids in an opened position and showing two of the floor anchors that are made in accordance with the present disclosure and that cooperate to anchor the floor of the tray of the article-storage unit in an erected use mode to an underlying surface as suggested in FIGS. 13-19.

Tray 12 is formed to include an interior storage region 26 that is shown in an empty state in FIG. 4 and that is sized to receive detachable tray organizer 14 therein as suggested in FIGS. 2, 3, and 5. Once tray organizer 14 is mated to tray 12 and floor 14, interior storage region 26 is partitioned by partition wall 16 to form rear and front chambers 27, 29 and rear chamber 27 is divided by rear divider panel 20 to form first and second compartments 271, 272. Tray organizer 14 is detachable from tray 12 so that container 13 can be folded when article-storage unit 10 is packaged for retail sale or not in use. Tray 12 is made of a pliable material and is collapsible to assume a compact size after removal of detachable tray organizer 14 from tray 12 in an illustrative embodiment as suggested in FIGS. 8-11.

Article-storage unit 10 also includes two front divider panels 19 as suggested in FIG. 4. Each front divider panel 19 can be located in front chamber 28 and coupled to tray 12 and partition wall 16 as suggested in FIGS. 3 and 4. In an illustrative embodiment, two front divider panels 19 are mounted in front chamber 28 to divide front chamber 28 to produce three compartments 281, 282, 283 as suggested in FIGS. 3 and 5. Both front divider panels 19 are detached from tray 12 and removed from interior storage region 26 of tray 12 along with detachable tray organizer 14 before tray 12 is collapsed as suggested in FIG. 8.

Container 13 is sized to receive tray organizer 14 and front divider panels 19 therein as suggested in FIGS. 3 and 4. Tray organizer 14 is detachable so that it can be separated from tray 12 at the option of a consumer so that container 13 can be folded as suggested in FIGS. 8-11 to assume a compact shape shown, for example, in FIG. 11.

Tray 12 includes an endless wall 25 coupled to floor 24 to define interior storage region 26 as shown, for example, in FIG. 4. Endless wall 25 includes, in series, rear wall 36, first side wall 37, front wall 38, and second side wall 39.

Rear lid 22 is coupled to a top edge of rear wall 36 for pivotable movement about a rear-lid pivot axis 22A between a closed position shown in FIG. 1 and an opened position shown in FIG. 2. In the closed position, rear lid 22 closes a top aperture opening into rear chamber 27. Rear lid 22 can be opened even though front lid 18 remains closed as shown in FIG. 2.

Front lid 18 is coupled to a top edge of partition wall 14 for pivotable movement about a front-lid pivot axis 18A between a closed position shown in FIG. 1 and an opened position shown in FIG. 3. In the closed position, front lid 18 closes a top aperture opening into front chamber 28. Front lid 18 can be opened even though rear lid 22 remains closed as shown in FIG. 3.

Endless side wall 25 of tray 12 includes, in series, eight articulated segments 251, 252, 253, 254, 255, 256, 257, and 258 as shown, for example, in FIG. 4. First and second segments 251, 252 cooperate to form rear wall 36 and define a rear-wall fold line 36F therebetween. Third and fourth segments 253, 254 cooperate to form first side wall 37 and define a first-side fold line 37F therebetween. Fifth and sixth segments 255, 256 cooperate to form front wall 38 and define a front-wall fold line 38F therebetween. Seventh and eighth segments 257, 258 cooperate to form second side wall 39 and to define a second-side fold line 39F therebetween.

Figure 8:
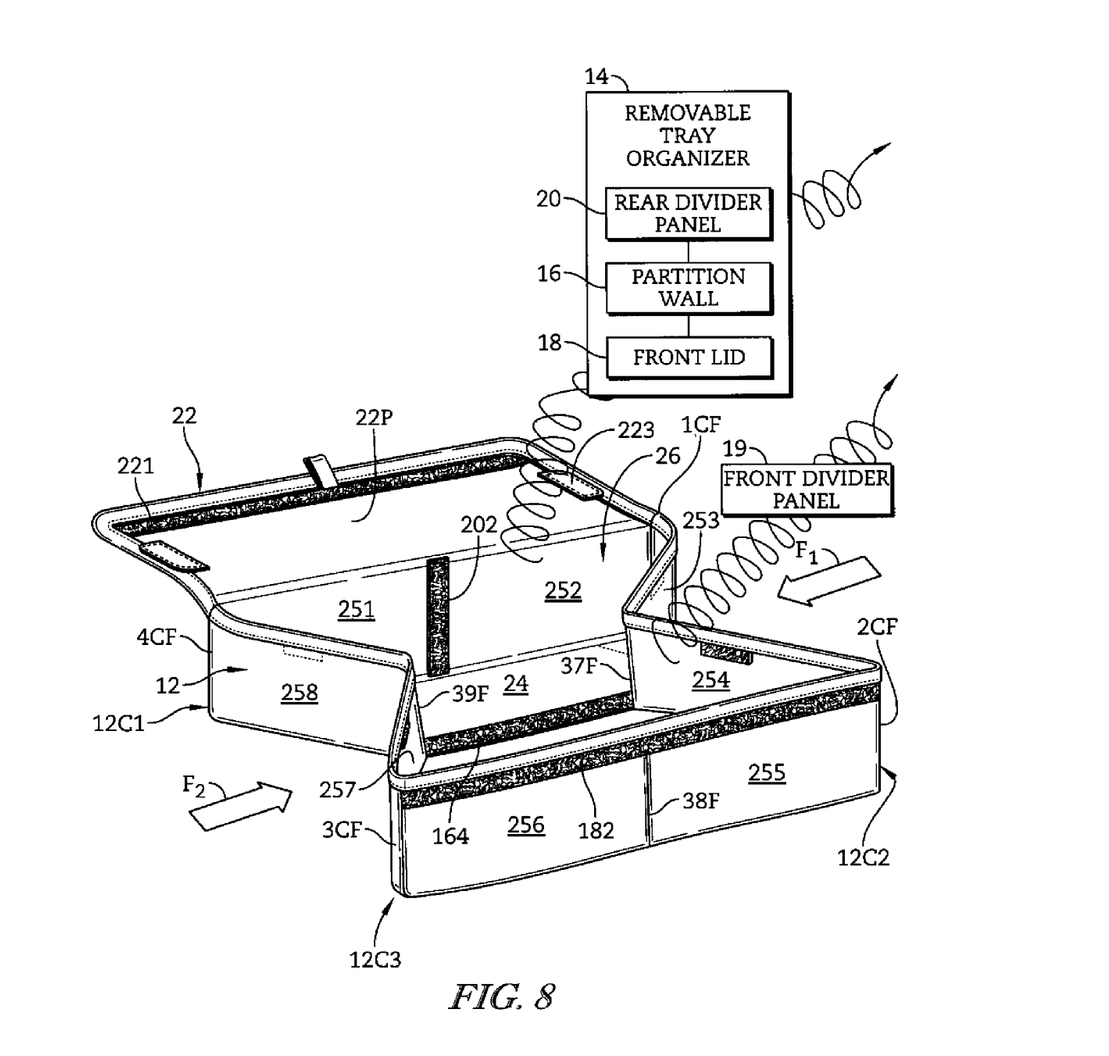
FIG. 8 is a perspective view showing the tray after the consumer has first removed a cover comprising the detachable partition wall and the front lid and pivoted the rear lid to an opened position and suggesting that the consumer apply (1) a first inwardly directed force to a first side wall (on a right side) of the tray (made of pliable materials) to cause two rectangular segments comprising the first side wall to pivot toward one another about a vertical first-side fold line and (2) an opposite second inwardly directed force to a second side wall (on a left side) of the tray to cause two rectangular segments comprising the second side wall to pivot toward one another about a vertical second-side fold line.
Figures 9, 10, 11, 12:
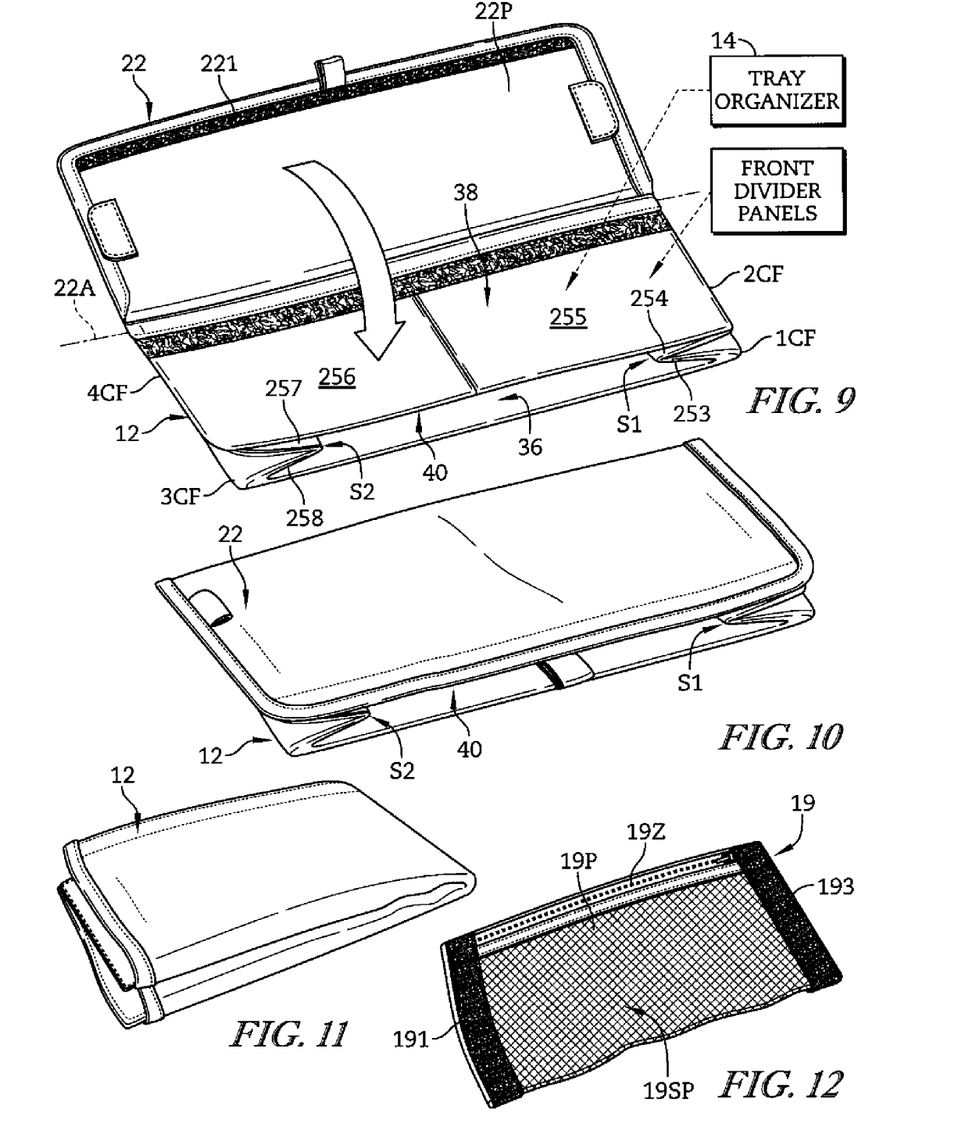
FIG. 9 is a perspective view showing that the tray has been collapsed accordion-style in accordance with the present disclosure to establish a compact first folded mode of the article-storage unit in which the rear wall is arranged to lie in close proximity to the front wall to define a segment-receiving space therebetween receiving therein the segments of each of the folded first and second side walls and also receiving therein the folded floor and suggesting that a folded tray organizer and one or more front divider panels could be placed on the rear wall of the tray before the rear lid is folded about the rear-lid pivot axis to reach the position shown in FIG. 10.
FIG. 10 is another perspective view showing that the rear lid has been pivoted forwardly about the rear-lid pivot axis to cause the underside of the rear lid to face toward the front wall and the folded first and second side walls to establish a more compact second folded mode of the article-storage unit.
FIG. 11 is yet another perspective view showing that the rectangular flattened structure shown in FIG. 10 has been folded in half to produce a most compact third folded mode of the article-storage unit.
FIG. 12 is an enlarged perspective view of one of the two front divider panels shown in FIG. 4 and sized to fit into the front chamber and showing that an illustrative front divider panel in accordance with the present disclosure is formed of an open-mesh material to include a storage pocket that can be closed by operation of a reclosable fastener (e.g., zipper) provided along a top edge of the panel.

FIGS. 8-11 show an illustrative process for folding article-storage unit 10 to convert the unit 10 from the erected use mode shown in FIGS. 1-3 to a most compact mode shown in FIG. 11. FIG. 8 is a perspective view showing tray 10 after the consumer has first removed detachable tray organizer 14 from interior storage region 26 of tray 12 and pivoted rear lid 22 to an opened position and suggesting that the consumer apply (1) a first inwardly directed force $F_1$ to first side wall 37 of tray 12 to cause two rectangular segments 253, 254 comprising first side wall 37 to pivot toward one another about a vertical first-side fold line 37F and (2) an opposite second inwardly directed force $F_2$ to second side wall 39 of tray 12 to cause two rectangular segments 257, 258 comprising second side wall 39 to pivot toward one another about a vertical second-side fold line 39F. This folding action is continued until tray 12 has been collapsed accordion-style in accordance with the present disclosure to establish a compact first folded mode of article-storage unit 10 as shown in FIG. 9 in which rear wall 36 is arranged to lie in close proximity to front wall 38 to define a segment-receiving space 40 therebetween receiving therein the segments 253, 254, 257, and 258 of each of the folded first and second side walls 37, 39 and also receiving therein the folded floor 24 and suggesting that a folded tray organizer 14 and one or more front divider panels 19 could be placed on rear wall 36 of tray 12 before rear lid 22 is folded about rear-lid pivot axis 22A to reach the position shown in FIG. 10.

As suggested in FIG. 10, rear lid 22 has been pivoted forwardly about rear-lid pivot axis 22A to cause the underside of rear lid 22 to face toward front wall 38 and folded first and second side walls 37, 39 to establish a more compact second folded mode of article-storage unit 10. As shown in FIG. 11, the rectangular flattened structure shown in FIG. 10 has been folded in half to produce a most compact third folded mode of article-storage unit 10.

Figure 18:
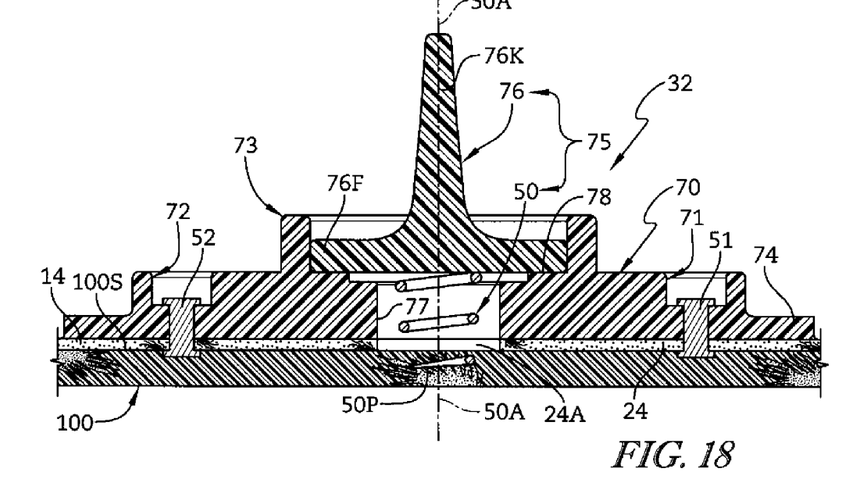
FIG. 18 is an enlarged sectional view taken along line 18-18 of FIG. 13 showing the floor anchor coupled to the floor of the collapsible tray by means of two rivets and to a vehicle carpet underlying the floor of the collapsible tray by means of a helically wound piercing member moved to pierce the underlying vehicle carpet.

In illustrative embodiments, floor 24 of tray 12 carries a floor anchor (e.g., 31-34) that can be operated by a consumer to anchor tray 12 to an underlayment 100 such as a pad or a carpet in the trunk 104 of a vehicle 102 as suggested in FIGS. 13 and 18. Each floor anchor 31-34 has an identical structure in an illustrative embodiment. Floor anchor 32 includes a piercing member 50 that can be rotated about a vertical axis 50A manually by a consumer as suggested in FIG. 19 to pierce an outer surface 100S of underlayment 100 to retain tray 12 temporarily in a stationary position on underlayment 100 as suggested in FIG. 18. The consumer can retract piercing member 50 from underlayment 100 by rotating piercing member 50 about vertical axis 50A in an opposite direction so that tray 12 can be folded easily to assume a stowable compact shape when article-storage unit 10 is not in use. Floor anchor 32 is coupled to floor 24 of collapsible tray 12 by means of two rivets 51, 52 and to a vehicle carpet 100 underlying floor 24 of collapsible tray 12 by means of sharpened point 50P moved to pierce the underlying vehicle carpet 100.

Article-storage unit 10 includes a detachable tray organizer 14 and a container 13 comprising a collapsible tray 12 and a rear lid 22 as suggested in FIGS. 4 and 5. Collapsible tray 12 is formed to include an interior storage region 26. Rear lid 22 is coupled to collapsible tray 12 for pivotable movement about a rear-lid pivot axis 22A relative to collapsible tray 12 from an opened position shown in FIG. 2 to a closed position shown in FIG. 4 to cover a portion of interior storage region 26.

Tray organizer 14 is configured to provide means for detachably mating with collapsible tray 12 as suggested in FIGS. 4 and 5 to (1) partition interior storage region 26 to establish a front chamber 28 that is arranged to lie in spaced-apart relation to rear-lid pivot axis 22A and a separate rear chamber 27 that is arranged to lie between rear-lid pivot axis 22A and front chamber 28 and to (2) close, at the option of a user, a front top aperture opening into front chamber 28 as suggested in FIG. 2 so that rear lid 22 is free to mate with detachable tray-organizer 14 upon movement of rear lid 22 about rear-lid pivot axis 22A relative to collapsible tray 12 to the closed position to close a rear top aperture opening into rear chamber 27 without blocking motion of a front lid 18 included in detachable tray organizer 14 away from collapsible tray 12 to open the front top aperture to gain access to any items stored in front chamber 28 as suggested in FIG. 3. Tray organizer 14 can be separated from tray 12 before container 13 is folded as suggested in FIGS. 8-11 to assume a compact shape.

Figure 7:
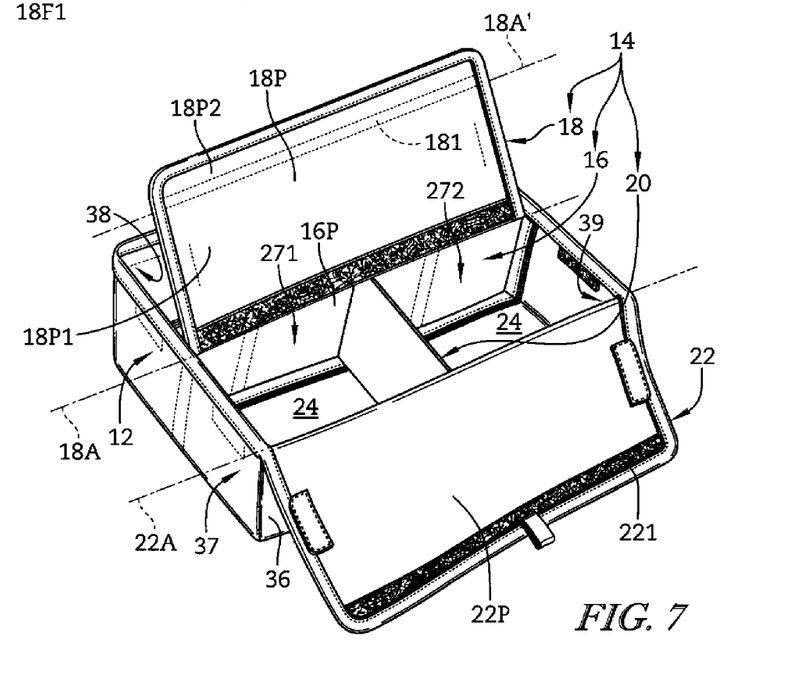
FIG. 7 is a view similar to FIG. 6 taken from a rearward point of view to show the rear chamber after the detachable rear divider panel included in the tray organizer and shown in FIG. 4 has been coupled to the rear wall by the consumer in the field to divide the rear chamber into two compartments.

Tray organizer 14 further includes a partition wall 16, a front lid 18, and a rear divider panel 20 as shown in FIG. 4. Partition wall 16 is coupled to collapsible tray 12 to partition interior storage region 26 to establish front and rear chambers 27, 28 in interior storage region 26 as shown in FIG. 5. Front lid 18 is coupled to partition wall 16 for pivotable movement about a front-lid pivot axis 18A relative to partition wall 16 and to collapsible tray 12 between a closed position mating with collapsible tray 12 to close the front top aperture as shown in FIG. 2 and an opened position disengaging collapsible tray 12 to open the front top aperture as shown in FIG. 3. Rear divider panel 20 is coupled to partition wall 16 as shown in FIG. 7.

Rear lid 22 includes a rear panel 22P coupled to collapsible tray 12 for pivotable movement about rear-lid pivot axis 22A. Rear lid 22 also includes first fastener means 22F1 for detachably fastening rear panel 22P to front lid 18 to retain rear lid 22 in the closed position when front lid 18 is in the closed position and also when front lid 18 is in the opened position as suggested in FIGS. 2-4.

Tray 12 includes a floor 24 and an endless side wall 25 coupled to floor 24 to form interior storage region 26 as shown, for example, in FIG. 4. Endless side wall 25 includes, in series, a rear wall 36 coupled to rear lid 22, a first side wall 37, a front wall 38 arranged to lie in generally spaced-apart parallel relation to rear wall 36 to locate partition wall 16 about midway therebetween, and a second side wall 39 coupled to rear wall 36 and arranged to lie in generally spaced-apart parallel relation to first side wall 37. Partition wall 16 is coupled to each of floor 24 and the first and second side walls 37, 39. Front lid 18 mates with front wall 38 upon movement of front lid 18 about front-lid pivot axis 18A to the closed position as suggested in FIG. 2.

Rear lid 22 further includes second fastener means 22F2 for detachably fastening rear panel 22P to at least one of first and second side walls 37, 39 to retain rear lid 22 in the closed position as suggested in FIGS. 2 and 5. In an illustrative embodiment, second fastener means 22F2 comprises hook-and-loop fasteners 223, 224 wherein fastener 223 is coupled to a first side of rear panel 22P and fastener 224 is coupled to a nearby top edge of first side wall 37 as shown in FIG. 5. Zippers, snaps, or other fasteners could also be used within the scope of this disclosure. For example, a first zipper track could be coupled to a first-side edge of rear panel 22P and a second zipper track could be coupled to a first-side edge of first side wall 37 alongside first compartment 271.

Tray organizer 14 further includes a rear divider panel 20 coupled to partition wall 16 and fastener means 20F for detachably fastening rear divider panel 20 to rear wall 36 when partition wall 16 is coupled to collapsible tray 12 to divide rear chamber 27 into separate first and second storage compartments 271, 272. Rear panel 22F includes an underside arranged to face toward floor 24 when rear lid 22 is in the closed position and a topside that is arranged to face away from floor 24 when rear lid 22 is in the closed position. Front lid 18 includes a front panel 18P having an underside arranged to face toward floor 24 when front lid 18 is in the closed position and a topside arranged to face away from floor 24 when front lid 18 is in the closed position. The first fastener means 22F of rear lid 22 includes a first fastener strip 221 coupled to the underside of rear panel 22P for movement therewith relative to collapsible tray 12 and a companion second fastener strip 222 coupled to the topside of front panel 18P of front lid 18 for movement therewith and configured to detachably grip first fastener strip 221 upon engagement therewith. In an illustrative embodiment, hook-and-loop fasteners are used to provide first and second fastener strips 221, 222.

Partition wall 16 includes a partition panel 16P and fastener means 16F for detachably coupling partition panel 16P to collapsible tray 12 to establish front and rear chambers 28, 27 in interior storage region 26 as suggested in FIG. 4. Partition panel 16P is arranged to extend above floor 24 from first side wall 37 to second side wall 39 as suggested in FIG. 5. The fastener means 16F of partition wall 16 is coupled to partition panel 16P and each of floor 24 and first and second side walls 37, 39 as suggested in FIG. 4. Front lid 18 mates with front wall 38 upon movement of front lid 18 to the closed position as suggested in FIGS. 1 and 3.

The fastener means 16F of partition wall 16 includes six fastener strips 161, 162, 163, 164, 165, and 166 in an illustrative embodiment as suggested in FIG. 4. A first fastener strip 161 is coupled to a first end edge of partition panel 16P. A companion second fastener strip 162 is coupled to first side wall 37 and configured to detachably grip first fastener strip 161 upon engagement therewith. A third fastener strip 163 is coupled to a bottom edge of partition panel 16P. A companion fourth fastener strip 164 is coupled to floor 24 and configured to detachably grip third fastener strip 163 upon engagement therewith. A fifth fastener strip 165 is coupled to a second end edge of partition panel 16P. A sixth fastener strip 166 is coupled to second side wall 39 and configured to detachably grip fifth fastener strip 166 upon engagement therewith.

Rear divider panel 20 is coupled to partition wall 16 to move therewith as suggested in FIG. 4. Rear divider-panel fastener means 20F is provided for detachably fastening rear divider panel 20 to rear wall 22 when partition wall 16 is coupled to collapsible tray 12 to divide rear chamber 27 into separate first and second storage compartments 271, 272 as suggested in FIGS. 4 and 5. Rear divider-panel fastener means includes a first fastener strip 201 coupled to rear divider panel 20 and a companion second fastener strip 202 coupled to rear wall 22 and configured to detachably grip first fastener strip 201 upon engagement therewith.

A front divider panel 19 is located in front chamber 28 as suggested in FIGS. 4 and 5. Front divider-panel fastener means 19F is provided for detachably fastening front divider panel 19 to each of partition panel 16P and front wall 38 to divide front chamber 28 into separate first and second storage compartments. In an illustrative embodiment, two front divider panels 19 cooperate to divide front chamber 28 into three separate compartments 281, 282, 283. As suggested in FIG. 18, front divider panel 19 is formed to include opposing mesh walls that lie next to one another and cooperate to form a storage pocket 19SP therebetween that can be accessed through a top opening closed normally by a zipper 19Z.

Front divider-panel fastener means 19F includes four fastener strips 191, 192, 193, 194 in an illustrative embodiment. First fastener strip 191 is coupled to an inner edge of front divider panel 19. A companion second fastener strip 192 is coupled to partition panel 16P and configured to detachably grip first fastener strip 191 upon engagement therewith. A third fastener strip 193 is coupled to an outer edge of front divider panel 19. A companion fourth fastener strip 194 is coupled to front wall 28 and configured to detachably grip third fastener strip 193 upon engagement therewith. Second fastener strip 192 is arranged to extend on partition panel 16P along a vertical line from floor 24 to front-lid pivot axis 18A in the embodiment of FIG. 6. Second fastener strip 192 (shown in phantom) is arranged to extend on partition panel along a horizontal line from first side wall 37 to second side wall 39 in an alternative embodiment as suggested in phantom in FIG. 5.

Figure 6:
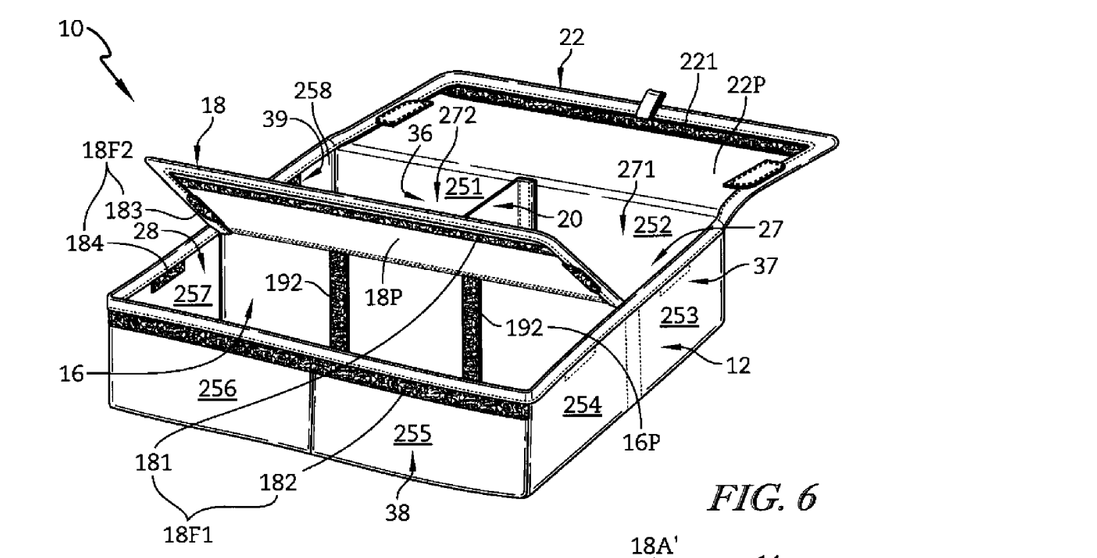
FIG. 6 is a view similar to FIG. 5 taken from a forward point of view to show an empty front chamber before the two detachable mesh-style front divider panels shown in FIG. 4 are mounted as shown in FIG. 5 to divide the front chamber into three compartments at the option of the consumer.

Front lid 18 includes a front panel 18P coupled to partition wall 16 for pivotable movement about front-lid pivot axis 18A and first fastener means 18F1 for detachably fastening front panel 18P to collapsible tray 12 to retain front lid 18 in the closed position as shown in FIG. 6. Partition wall 16 is coupled to each of floor 14 and first and second side walls 37, 39. The first fastener means 18F1 of front lid 18 is coupled to front panel 18P and to front wall 38 as shown in FIG. 3. In an illustrative embodiment, first fastener means 18F1 comprises hook-and-loop fastener strips 181, 182. A first fastener strip 181 is coupled to the underside of front lid 18 for movement therewith relative to tray 12 and a companion second fastener strip 182 is coupled to front wall 38 and is configured to detachably engage first fastener strip 181 upon engagement therewith.

Front lid 18 further includes second fastener means 18F2 for detachably fastening front panel 38 to at least one of first and second side walls 37, 39 to retain front lid 18 in the closed position as suggested in FIGS. 3, 5, and 6. In an illustrative embodiment, second fastener means 18F2 comprises hook-and-loop fasteners 183, 184 wherein fastener 183 is coupled to a first side of front panel 18P and fastener 184 is coupled to nearby top edge of first side wall 37 as shown in FIG. 5. It is within the scope of the present disclosure to use a zipper to provide the second fastener means and couple a first zipper track to a first-side edge of front panel 18F and second zipper track to a first-side edge of first side wall 37 alongside first compartment 281 of front chamber 28.

Front lid 18 includes a front panel 18P coupled to partition wall 16 for pivotable movement about front-lid pivot axis 18A relative to partition wall 16. Front panel 18P includes a top plate 18P1 and a front lip 18P2 as suggested in FIG. 3. Top plate 18P1 is arranged to lie above and in spaced-apart confronting relation to floor 14 when front lid 18 is in the closed position. Front lip 18P2 is coupled to a front edge of top plate 18P1 for pivotable movement about front-lip pivot axis 18A relative to top plate 18P1 and arranged to lie in spaced-apart relation to partition wall 16 to locate top plate 18P1 between front lip 18P2 and partition wall 16. First fastener means 18F1 is provided for detachably fastening front lip 18P2 to collapsible tray 12 to retain front lid 18 in the closed position. First fastener strip 181 is coupled to front lip 18P2 in an illustrative embodiment.

Tray 12 is made of a pliable material and includes a floor 24 and an endless side wall 25 coupled to floor 24 to form interior storage region 26 and coupled to rear lid 22 at rear-lid pivot axis 22A. Endless side wall 25 includes, in series, as suggested in FIGS. 4 and 8, a first segment 251 coupled to rear lid 22 at rear-lid pivot axis 22A, a second segment 251 coupled to rear lid 22 at rear-lid pivot axis 22A and to first segment 251 at a rear-wall fold line 36F to define rear wall 36, a third segment 253 coupled to second segment 252 at a first-corner fold line 1CF to establish a first corner 12C1 of collapsible tray 12, a fourth segment 254 coupled to fifth segment 255 at a second-corner fold line 2CF to establish a second corner 12C2 of collapsible tray 12, a sixth segment 256 coupled to fifth segment 255 at a front-wall fold line 38F to define front wall 38, a seventh segment 257 coupled to sixth segment 256 at a third-corner fold line 3CF to establish a third corner 12C3 of collapsible tray 12, and an eighth segment 258 coupled to seventh segment 257 at a second-side fold line 39F to define second side wall 239 and to first segment 251 at a fourth-corner fold line 4CF to establish a fourth corner 12CA of collapsible tray 12.

Foldable storage unit 10 is reconfigurable by a user to assume one of an erected use mode shown in FIG. 5 and a compact first folded mode shown in FIG. 9. In the compact erected use mode, shown, for example, in FIG. 5, first and second segments 251, 252 lie in coplanar relation to one another to establish rear wall 36, third and fourth segments 253, 254 lie in coplanar relation to one another to establish first side wall 37 and orient first side wall 37 to lie in perpendicular relation to rear wall 36, fifth and sixth segments 255, 256 lie in coplanar relation to one another to establish front wall 38 and orient front wall 38 to lie in perpendicular relation to first side wall 37 and in spaced-apart parallel relation to rear wall 36, and seventh and eighth segments 257, 258 lie in coplanar relation to one another to establish second side wall 39 and to orient second side wall 39 to lie in perpendicular relation to each of front and rear walls 38, 36 and in spaced-apart parallel relation to first side wall 37. In the compact first folded mode shown, for example, in FIG. 9, rear wall 36 is arranged to lie in closely confronting generally parallel relation to front wall 38 to define a segment-receiving space 40 therebetween, third and fourth segments 253, 254 are arranged to lie in the segment-receiving space 40 provided between rear and front walls 36, 38 in closely confronting relation to one another to form a first-side segment stack S1, and seventh and eighth segments 257, 258 are arranged to lie in the segment-receiving space 40 provided between rear and front walls 36, 38 in closely confronting relation to one another to form a second-side segment stack S2 arranged to lie in spaced-apart relation to the first-side segment stack S1, and floor 24 is folded to lie substantially in the segment-receiving space 40 provided between rear and front walls 36, 38.

Each of the segments 251-258 includes an inner surface facing into interior storage region 26 and an outer surface facing away from interior storage region 26 when foldable storage unit 10 is in the erected use mode. In the compact first folded mode of foldable storage unit 10 shown, for example, in FIG. 9, inner surface of second segment 252 faces toward inner surface of third segment 253, outer surface of third segment 253 faces toward outer surface of fourth segment 254, inner surface of fourth segment 254 faces toward inner surface of fifth segment 255, inner surface of first segment 251 faces toward inner surface of eighth segment 258, outer surface of eighth segment 258 faces toward outer surface of seventh segment 257, and inner surface of seventh segment 257 faces toward inner surface of sixth segment 256.

Foldable storage unit 10 is also reconfigurable by a user to assume a more compact second folded mode shown, for example, in FIG. 10. Rear lid 22 includes an underside arranged to face toward floor 24 and a topside arranged to face away from floor 24 when foldable storage unit 10 is in the erected use mode and rear lid 22 is in the closed position. The underside of rear lid 22 is arranged to face toward and lie in closely confronting relation to outer surfaces of fifth and sixth segments 255, 256 to establish a compact second folded mode of foldable storage unit 10 in response to pivoting movement of rear lid 22 about rear-lid pivot axis 22A toward rear wall 36.

Foldable storage unit 10 is also reconfigurable by a user to assume a most compact third folded mode of foldable storage unit 10 shown, for example, in FIG. 11. The topside of rear lid 22 includes a right-side portion arranged to lie in closely confronting and generally parallel relation to second segment 252 and a left-side portion arranged to lie in closely confronting and generally parallel relation to first segment 251. The right-side portion of the topside of rear lid 22 is arranged to lie in closely confronting and generally parallel relation to the left-side portion of the topside of rear lid 22 in response to pivoting movement of second segment 252 about rear-wall fold line 37F toward first segment 251 and pivoting movement of fifth segment 255 about front-wall fold line 38F toward sixth segment 256.

Foldable storage unit 10 further includes anchor means 30 coupled to floor 24 of collapsible tray 12 for piercing a surface 100S of an underlayment 100 under floor 24 to retain collapsible tray 12 on underlayment 100. Anchor means 30 includes a first floor anchor 31 coupled to a first corner portion of floor 24 at first corner 12C1 of collapsible tray 12, a second floor anchor 32 coupled to a second corner portion of floor 24 at second corner 12C2 of collapsible tray 12, a third floor anchor 33 coupled to a third corner portion of floor 24 at third corner 12C3 of collapsible tray 12, and a fourth floor anchor 34 coupled to a fourth corner portion of floor 24 at fourth corner 12C4 of collapsible tray 12.

Figure 19:
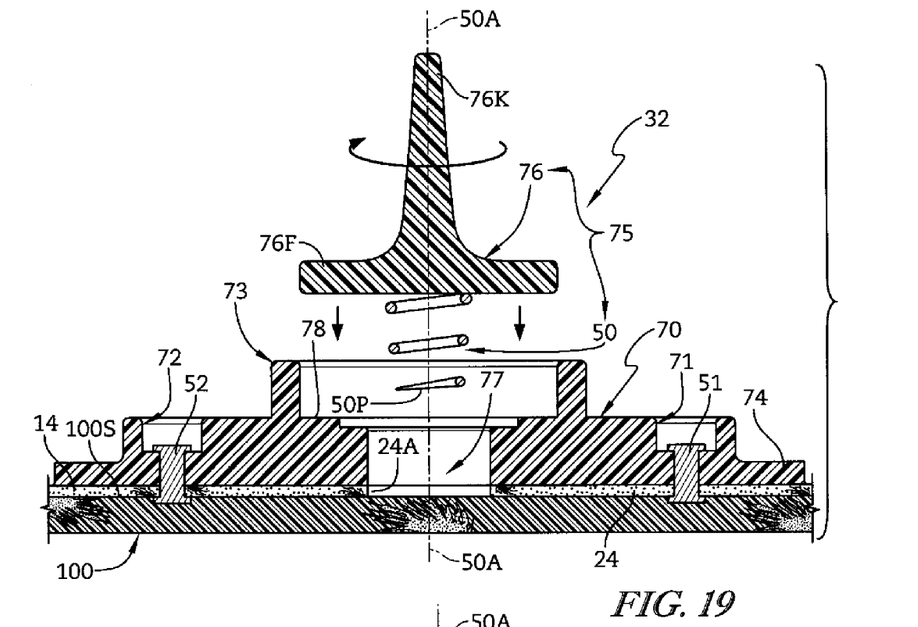
FIG. 19 is a view similar to FIG. 18 showing the floor anchor before it is operated to pierce a surface of an underlayment located under the floor of the tray.

Floor 24 is formed to include an anchor-receiving aperture 24A (as shown in FIGS. 18 and 19) for each of floor anchors 31-34. Floor anchor 32, for example, is coupled to floor 24 at the anchor-receiving aperture 24A and arranged to extend through floor 24 to reach an underlayment 100 located under floor 24 as suggested in FIG. 18.

Figure 16:
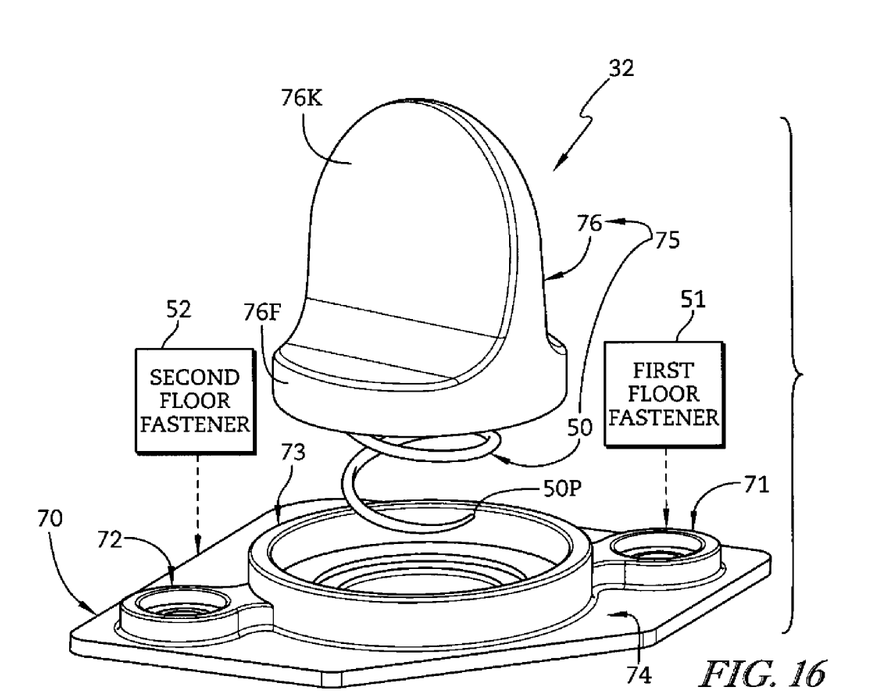
FIG. 16 is an enlarged exploded perspective assembly view of components comprising a floor anchor in accordance with the present disclosure.
Figure 17:
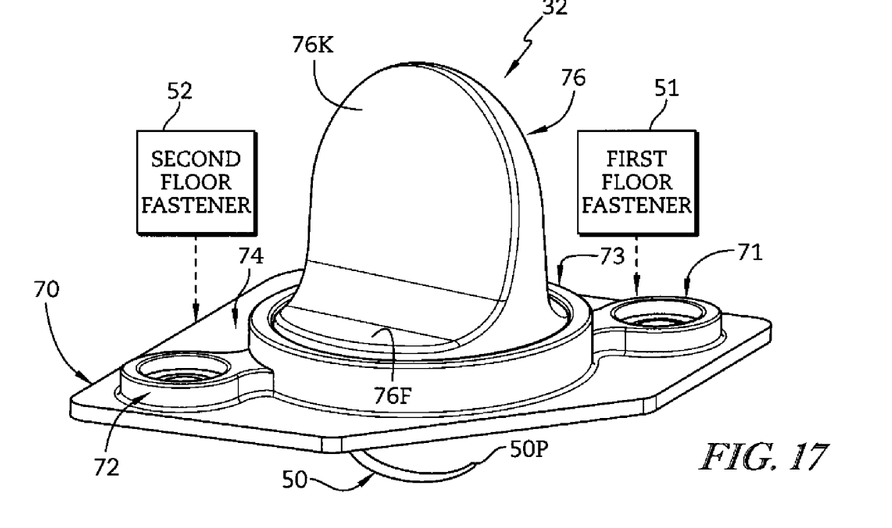
FIG. 17 is a view similar to FIG. 16 after the components have been assembled to produce a floor anchor.

Floor anchor includes a base 70, a fastener 51, 52, and an anchorage 75 comprising a piercing member 50 and a grip 76 coupled to piercing member 50 as suggested in FIG. 16. Base 70 is located in interior storage region 26 of collapsible tray 12 and formed to include a central aperture 77 aligned and in communication with the anchor-receiving aperture 24A formed in floor 24 to establish an aligned position of base 70 on floor 24. Fastener 51, 52 is coupled to floor 24 and base 70 to retain base 70 in the aligned position on floor 24. Grip 76 is configured to provide means for supporting piercing member 50 in a tethered position on base 70 for movement under the control of a user in a first direction to move piercing member 50 to pierce surface 100S of an underlayment 100 located below floor 24 and remain in a temporary locked position therein and in an opposite second direction to remove piercing member 50 from underlayment 100 without untethering piercing member 50 from base 70 so that the user can move piercing member 50 relative to base 70 in the first direction while floor 24 of tray 12 is at rest on an underlayment 100 to anchor tray 12 to underlayment 100 and alternatively can move piercing member 50 relative to base 70 in the opposite second direction to disengage piercing member 50 from underlayment 100 to release tray 12 from underlayment 100.

Piercing member 50 included in anchorage 75 is corkscrew-shaped in an illustrative embodiment as shown in FIG. 16. Piercing member 50 has an upper end coupled to grip 76 and a lower end formed to include a sharpened point 50 and is helically wound about a vertical axis 50A extending through central aperture 77 of base 70. Sharpened point 50P is arranged to lie in central aperture 77 of base 70 when piercing member 50 is moved to assume the retracted position and to lie outside of central aperture 77 of base 70 when piercing member 50 is moved to assume the temporary locked position as shown in FIG. 18.

Foldable storage unit 10, in accordance with the present disclosure, may be mounted in a stationary position on surface 100S on an underlayment 100 provided in a motor vehicle 102 as shown, for example, in FIG. 13. Storage unit 10 can be attached to surface 100S by use of floor anchors 31-34 that are installed by a user, as shown in FIGS. 18 and 19. Foldable storage unit 10 may be collapsed and folded for storage when not needed, as shown in FIGS. 8-11.

Each of floor anchors 31-34 is located on floor 24 in one of the four corners 12C1-4 of tray 12 as shown in FIGS. 5 and 13-15. Floor anchors 31-34 are used to secure floor 24 of tray 12 to surface 100S of motor vehicle 104 so that the position of article storage unit 10 remains fixed in, for example, a rear cargo area 102 of vehicle 104 during movement of vehicle 104 as shown in FIG. 1.

Base 70 of floor anchor 32 includes fastener rings 71, 72 that are configured to accept floor fasteners 51, 52 in the form of rivets used to secure a support plate 74 included in base 70 to floor 24 of tray 12 as shown in FIGS. 16-19. Support plate 74 also includes a central support ring 73 located between fastener rings 71, 72 used to orient and support a rotatable anchorage 75 comprising grip 76 and piercing member 50 during installation of floor anchor 32 onto surface 100S of underlayment 100. In illustrative embodiments, base 70 is a monolithic structure.

Anchorage 75 of floor anchor 32 includes a grip 76 and a corkscrew-shaped piercing member 50 that extends downwardly from grip 76 as suggested in FIGS. 16 and 19. Grip 76 includes a knob 76K that is configured to be grasped by a user to permit anchorage 75 to be screwed in a clockwise direction about axis 50A to pierce surface 100S and enter underlayment 100 as suggested in FIGS. 19 and 18. Anchorage 75 can be removed from surface 100S by rotating grip 76 in a counter-clockwise direction about axis 50A.

A foundation 76F of grip 76 is generally circular and has a diameter slightly less than a diameter of an inner surface of cylindrical wall of support ring 73. Corkscrew-shaped piercing member 50 extends downwardly from foundation 76F and is formed to include a sharpened point 50P that allows corkscrew-shaped piercing member 50 to pierce surface 100S of underlayment 100. Piercing member 50 is inserted into a center passageway 77 formed in base 70 to cause grip foundation 76F to overlie a foundation-support platform 78 provided in base 70 and downward pressure is exerted while anchorage 75 is turned to cause piercing member 50 to pierce surface 100S and enter into underlayment 100. Rotation of anchorage 75 continues until a bottom surface of grip 76 reaches foundation-support platform 78 of base 70 as shown in FIG. 18.

The invention claimed is:

1. An article-storage unit comprising
a container including a collapsible tray formed to include an interior storage region and a rear lid coupled to the collapsible tray for pivotable movement about a rear-lid pivot axis relative to the collapsible tray from an opened position to a closed position to cover a portion of the interior storage region and detachable tray-organizer means for detachably mating with the collapsible tray to partition the interior storage region to establish a front chamber that is arranged to lie in spaced-apart relation to the rear-lid pivot axis and a separate rear chamber that is arranged to lie between the rear-lid pivot axis and the front chamber and to close, at the option of a user, a front top aperture opening into the front chamber so that the rear lid is free to mate with the detachable tray-organizer means upon movement of the rear lid about the rear-lid pivot axis relative to the collapsible tray to the closed position to close a rear top aperture opening into the rear chamber without blocking motion of a front lid included in the detachable tray-organizer means away from the collapsible tray to open the front top aperture to gain access to any items stored in the front chamber.

2. The article-storage unit of claim 1, wherein the detachable tray-organizer means further includes a partition wall coupled to the collapsible tray to partition the interior storage region to establish the front and rear chambers in the interior storage region and the front lid of the detachable tray-organizer means is coupled to the partition wall for pivotable movement about a front-lid pivot axis relative to the partition wall and to the collapsible tray between a closed position mating with the collapsible tray to close the front top aperture and an opened position disengaging the collapsible tray to open the front top aperture.

3. The article-storage unit of claim 2, wherein the rear lid includes a rear panel coupled to the collapsible tray for pivotable movement about the rear-lid pivot axis and first fastener means for detachably fastening the rear panel to the front lid of the detachable tray-organizer means to retain the rear lid in the closed position when the front lid is in the closed position and also when the front lid is in the opened position.

4. The article-storage unit of claim 3, wherein the collapsible tray includes a floor and an endless side wall coupled to the floor to form the interior storage region, the endless side wall includes, in series, a rear wall coupled to the rear lid, a first side wall, a front wall arranged to lie in spaced-apart relation to the rear wall to locate the partition wall about midway therebetween, and a second side wall coupled to the rear wall and arranged to lie in spaced-apart relation to the first side wall, the partition wall is coupled to each of the floor and the first and second side walls, and the front lid mates with the front wall upon movement of the front lid about the front-lid pivot axis to the closed position.

5. The article-storage unit of claim 4, wherein the rear lid further includes second fastener means for detachably fastening the rear panel to at least one of the first and second side walls to retain the rear lid in the closed position.

6. The article-storage unit of claim 4, wherein the detachable tray-organizer means further includes a rear divider panel coupled to the partition wall and fastener means for detachably fastening the rear divider panel to the rear wall when the partition wall is coupled to the collapsible tray to divide the rear chamber into separate first and second Storage compartments.

7. The article-storage unit of claim 4, wherein the rear panel includes an underside arranged to face toward the floor when the rear lid is in the closed position and a topside that is arranged to face away from the floor when the rear lid is in the closed position, the front lid includes a front panel having an underside arranged to face toward the floor when the front lid is in the closed position and a topside arranged to face away from the floor when the front lid is in the closed position, the first fastener means of the rear lid includes a first fastener strip coupled to the underside of the rear panel for movement therewith relative to the collapsible tray and a companion second fastener strip coupled to the topside of the front panel of the front lid for movement therewith and configured to detachably grip the first fastener strip upon engagement therewith.

8. The article-storage unit of claim 2, wherein the partition wall of the detachable tray-organizer means includes a partition panel and fastener means for detachably coupling the partition panel to the collapsible tray to establish the front and rear chambers in the interior storage region.

9. The article-storage unit of claim 8, wherein the collapsible tray includes a floor and an endless side wall coupled to the floor to form the interior storage region, the endless side wall includes a rear wall coupled to the rear lid, a first side wall, a front wall arranged to lie in spaced-apart relation to the rear wall to locate the partition panel about midway therebetween, the partition panel is arranged to extend above the floor from the first side wall to the second side wall, the fastener means of the partition wall is coupled to the partition panel and each of the floor and the first and second side walls, and the front lid mates with the front wall upon movement of the front lid to the closed position.

10. The article-storage unit of claim 9, wherein the fastener means of the partition wall includes a first fastener strip coupled to a first end edge of the partition panel, a companion second fastener strip coupled to the first side wall and configured to detachably grip the first fastener strip upon engagement therewith, a third fastener strip coupled to a bottom edge of the partition panel, a companion fourth fastener strip coupled to the floor and configured to detachably grip the third fastener strip upon engagement therewith, a fifth fastener strip coupled to a second end edge of the partition panel, and a sixth fastener strip coupled to the second side wall and configured to detachably grip the fifth fastener strip upon engagement therewith.

11. The article-storage unit of claim 9, wherein the detachable tray-organizer means further includes a rear divider panel coupled to the partition wall to move therewith and rear divider-panel fastener means for detachably fastening the rear divider panel to the rear wall when the partition wall is coupled to the collapsible tray to divide the rear chamber into separate first and second storage compartments.

12. The article-storage unit of claim 11, wherein the rear divider-panel fastener means includes a first fastener strip coupled to the rear divider panel and a companion second fastener strip coupled to the rear wall and configured to detachably grip the first fastener strip upon engagement therewith.

13. The article-storage unit of claim 9, further comprising a front divider panel located in the front chamber and front divider-panel fastener means for detachably fastening the front divider panel to each of the partition panel and the front wall to divide the front chamber into separate first and second storage compartments.

14. The article-storage unit of claim 13, wherein the front divider-panel fastener means includes a first fastener strip coupled to an inner edge of the front divider panel, a companion second fastener strip coupled to the partition panel and configured to detachably grip the first fastener strip upon engagement therewith, a third fastener strip coupled to an outer edge of the front divider panel, and a companion fourth fastener strip coupled to the front wall and configured to detachably grip the third fastener strip upon engagement therewith.

15. The article-storage unit of claim 14, wherein the companion second fastener strip is arranged to extend on the partition panel along a horizontal line from the first side wall to the second side wall.

16. The article-storage unit of claim 14, wherein the companion second fastener strip is arranged to extend on the partition panel along a vertical line from the floor to the front-lid pivot axis.

17. The article-storage unit of claim 2, wherein the front lid of the detachable tray-organizer means includes a front panel coupled to the partition wall for pivotable movement about a front-lip pivot axis and first fastener means for detachably fastening the front panel to the collapsible tray to retain the front lid in the closed position.

18. The article-storage unit of claim 17, wherein the collapsible tray includes a floor and an endless side wall coupled to the floor to cooperate with the floor to form the interior storage region, the endless side wall includes a rear wall coupled to the rear lid, a first side wall, a front wall arranged to lie in spaced-apart relation to the rear wall to locate the partition wall about midway therebetween, and a second side wall coupled to the rear wall and arranged to lie in spaced-apart relation to the first side wall, the partition wall is coupled to each of the floor and the first and second side walls, and the first fastener means of the front lid is coupled to the front panel and to the front wall.

19. The article-storage unit of claim 18, wherein the front lid further includes second fastener means for detachably fastening the front panel to at least one of the first and second side walls to retain the front lid in the closed position.

20. The article-storage unit of claim 2, wherein the front lid of the detachable tray-organizer means includes a front panel coupled to the partition wall for pivotable movement about the front-lid pivot axis relative to the partition wall, the front panel includes a top plate arranged to lie above and in spaced-apart confronting relation to the floor when the front lid is in the closed position and a front lip coupled to a front edge of the top plate for pivotable movement about a front-lip pivot axis relative to the top plate and arranged to lie in spaced-apart relation to the partition wall to locate the top plate between the front lip and the partition wall, and a first fastener means for detachably fastening the front lip to the collapsible tray to retain the front lid in the closed position.

21. The article-storage unit of claim 20, wherein the collapsible tray includes a floor and an endless side wall coupled to the floor to cooperate with the floor to form the interior storage region, the endless side wall includes a rear wall coupled to the rear lid, a first side wall, a front wall arranged to lie in spaced-apart relation to the rear wall to locate the partition wall about midway therebetween, and a second side wall coupled to the rear wall and arranged to lie in spaced-apart relation to the first side wall, the partition wall is coupled to each of the floor and the first and second side walls, and the first fastener means of the front lid is coupled to the front lip and to the front wall.

22. The article-storage unit of claim 21, wherein the front lid further includes second fastener means for detachably fastening the front panel to at least one of the first and second side walls to retain the front lid in the closed position.

23. The article-storage unit of claim 22, wherein the detachable tray-organizer means further includes a rear divider panel coupled to the partition wall to move therewith and fastener means for detachably fastening the rear divider panel to the rear wall when the partition wall is coupled to the collapsible tray to divide the rear chamber into separate first and second item-storage compartments.

24. The article-storage unit of claim 23, further comprising a front divider panel located in the front chamber and fastener means for detachably fastening the front divider panel to each of the partition wall and a front wall of the collapsible tray that is arranged to lie in a spaced-apart relation to the first lid-pivot axis to locate the partition panel therebetween to divide the front chamber into separate first and second storage compartments.

25. The article-storage unit of claim 1, wherein the collapsible tray is made of a pliable material and includes a floor and an endless side wall coupled to the floor to form the interior storage region and coupled to the rear lid at the rear-lid pivot axis and the endless side wall includes, in series, a first segment coupled to the rear lid at the rear-lid pivot axis, a second segment coupled to the rear lid at the rear-lid pivot axis and to the first segment at a rear-wall fold line to define a rear wall, a third segment coupled to the second segment at a first-corner fold line to establish a first corner of the collapsible tray, a fourth segment coupled to the third segment at a first-side fold line to define a first side wall, a fifth segment coupled to the fourth segment at a second-corner fold line to establish a second corner of the collapsible tray, a sixth segment coupled to the fifth segment at a front-wall fold line to define a front wall, a seventh segment coupled to the sixth segment at a third-corner fold line to establish a third corner of the collapsible tray, and an eighth segment coupled to the seventh segment at a second-side fold line to define a second side wall and to the first segment at a fourth-corner fold line to establish a fourth corner of the collapsible tray.

26. The article-storage unit of claim 25, wherein the foldable storage unit is reconfigurable by a user to assume one of an erected use mode and a compact first folded mode and
wherein, in the compact erected use mode, the first and second segments lie in coplanar relation to one another to establish the rear wall, the third and fourth segments lie in coplanar relation to one another to establish the first side wall and orient the first side wall to lie in perpendicular relation to the rear wall, the fifth and sixth segments lie in coplanar relation to one another to establish the front wall and orient the front wall to lie in perpendicular relation to the first side wall and in spaced-apart parallel relation to the rear wall, and the seventh and eighth segments lie in coplanar relation to one another to establish the second side wall and to orient the second side wall to lie in perpendicular relation to each of the front and rear walls and in spaced-apart parallel relation to the first side wall and
wherein, in the compact first folded mode, the rear wall is arranged to lie in closely confronting generally parallel relation to the front wall to define a segment-receiving space therebetween, the third and fourth segments are arranged to lie in the segment-receiving space between the rear and front walls in closely confronting relation to one another to form a first-side segment stack, and the seventh and eighth segments are arranged to lie in the segment-receiving space between the rear and front walls in closely confronting relation to one another to form a second-side segment stack arranged to lie in spaced-apart relation to the first-side segment stack, and the floor is folded to lie substantially in the segment-receiving space provided between the rear and front walls.

27. The article-storage unit of claim 26, wherein each of the segments includes an inner surface facing into the interior storage region and an outer surface facing away from the interior storage region when the foldable storage unit is in the erected use mode and wherein, in the compact first folded mode of the foldable storage unit, the inner surface of the second segment faces toward the inner surface of the third segment, the outer surface of the third segment faces toward the outer surface of the fourth segment, the inner surface of the fourth segment faces toward the inner surface of the fifth segment, the inner surface of the first segment faces toward the inner surface of the eighth segment, the outer surface of the eighth segment faces toward the outer surface of the seventh segment, and the inner surface of the seventh segment faces toward the inner surface of the sixth segment.

28. The article-storage unit of claim 27, wherein the foldable storage unit is also reconfigurable by a user to assume a more compact second folded mode, the rear lid includes an underside arranged to face toward the floor and a topside arranged to face away from the floor when the foldable storage unit is in the erected use mode and the rear lid is in the closed position and wherein the underside of the rear lid is arranged to face toward and lie in closely confronting relation to the outer surfaces of the fifth and sixth segments to establish a compact second folded mode of the foldable storage unit in response to pivoting movement of the rear lid about the rear-lid pivot axis toward the rear wall.

29. The article-storage unit of claim 28, wherein the foldable storage unit is also reconfigurable by a user to assume a most compact third folded mate of the foldable storage unit, the topside of the rear lid includes a right-side portion arranged to lie in closely confronting and generally parallel relation to the second segment and a left-side portion arranged to lie in closely confronting and generally parallel relation to the first segment, and wherein the right-side portion of the topside of the rear lid is arranged to lie in closely confronting and generally parallel relation to the left-side portion of the topside of the rear lid in response to pivoting movement of the second segment about the rear-wall fold line toward the first segment and pivoting movement of the fifth segment about the front-wall fold line toward the sixth segment.

30. The foldable storage unit of claim 25, further comprising anchor means coupled to the floor of the collapsible tray for piercing a surface of an underlayment under the floor to retain the collapsible tray on the underlayment.

31. The foldable storage unit of claim 30, wherein the anchor means includes a first floor anchor coupled to a first corner portion of the floor at the first corner of the collapsible tray, a second floor anchor coupled to a second corner portion of the floor at the second corner of the collapsible tray, a third floor anchor coupled to a third corner portion of the floor at the third corner of the collapsible tray, and a fourth floor anchor coupled to a fourth corner portion of the floor at the fourth corner of the collapsible tray.

32. The foldable storage unit of claim 30, wherein the floor is formed to include an anchor-receiving aperture, the anchor means includes a floor anchor coupled to the floor at the anchor-receiving aperture and arranged to extend through the floor to reach an underlayment located under the floor.

33. The foldable storage unit of claim 32, wherein the floor anchor includes a base located in the interior storage region of the collapsible tray and formed to include a central aperture aligned and in communication with the anchor-receiving aperture formed in the floor to establish an aligned position of the base on the floor, a fastener coupled to the floor and the base to retain the base in the aligned position, a piercing member, and grip means for supporting the piercing member in a tethered position on the base for movement under the control of a user in a first direction to move the piercing member to pierce the surface of an underlayment located below the floor and remain in a temporary locked position therein and in an opposite second direction to remove the piercing member from the underlayment without untethering the piercing member from the base so that the user can move the piercing member relative to the base in the first direction while the floor of the collapsible tray is at rest on an underlayment to anchor the collapsible tray to the underlayment and alternatively can move the piercing member relative to the base in the opposite second direction to disengage the piercing member from the underlayment to release the collapsible tray from the underlayment.

34. The foldable storage unit of claim 1, further comprising anchor means coupled to the floor of the collapsible tray for piercing a surface of an underlayment under the floor to retain the collapsible tray on the underlayment.

35. The foldable storage unit of claim 34, wherein the floor is formed to include an anchor-receiving aperture, the anchor means includes a floor anchor coupled to the floor at the anchor-receiving aperture and arranged to extend through the floor to reach an underlayment located under the floor.

36. The foldable storage unit of claim 35, wherein the floor anchor includes a base located in the interior storage region of the collapsible tray and formed to include a central aperture aligned and in communication with the anchor-receiving aperture formed in the floor to establish an aligned position of the base on the floor, a fastener coupled to the floor and the base to retain the base in the aligned position, a piercing member, and grip means for supporting the piercing member in a tethered position on the base for movement under the control of a user in a first direction to move the piercing member to pierce the surface of an underlayment located below the floor and remain in a temporary locked position therein and in an opposite second direction to remove the piercing member from the underlayment without untethering the piercing member from the base so that the user can move the piercing member relative to the base in the first direction while the floor of the collapsible tray is at rest on an underlayment to anchor the collapsible tray to the underlayment and alternatively can move the piercing member relative to the base in the opposite second direction to disengage the piercing member from the underlayment to release the collapsible tray from the underlayment.

37. The foldable storage unit of claim 36, wherein the piercing member included is corkscrew-shaped and has an upper end coupled to the gripping means and a lower end formed to include a sharpened point and is helically wound about a vertical axis extending through the central aperture of the base.

38. The foldable storage unit of claim 36, wherein the piercing member has an upper end coupled to the gripping means and a lower end formed to include a sharpened point and the sharpened point is arranged to lie in the central aperture of the base when the piercing member is moved to assume the retracted position and to lie outside of the central aperture of the base when the piercing member is moved to assume the temporary locked position.

39. An article-storage unit comprising
a collapsible tray including a floor and an endless side wall coupled to the floor to form an interior storage region,
a tray-organizer located in the interior storage region and detachably coupled to the collapsible tray to partition the interior storage region to form front and rear chambers, and
anchor means located in each of the front and rear chambers and coupled to the floor of the collapsible tray for selectively piercing a surface of an underlayment under the floor to retain the collapsible tray in a stationary position on the underlayment
wherein the floor is formed to include an anchor-receiving aperture, the anchor means includes a floor anchor coupled to the floor at the anchor-receiving aperture and arranged to extend through the floor to reach an underlayment located under the floor, and
wherein the floor anchor includes a base located in the interior storage region of the tray and formed to include a central aperture aligned and in communication with the anchor-receiving aperture formed in the floor to establish an aligned position of the base on the floor, a fastener coupled to the floor and the base to retain the base in the aligned position, a piercing member, and grip means for supporting the piercing member in a tethered position on the base for movement under the control of a user in a first direction to move the piercing member to pierce the surface of an underlayment located below the floor and remain in a temporary locked position therein and in an opposite second direction to remove the piercing member from the underlayment without untethering the piercing member from the base so that the user can move the piercing member relative to the base in the first direction while the floor of the tray is at rest on an underlayment to anchor the tray to the underlayment and alternatively can move the piercing member relative to the base in the opposite second direction to disengage the piercing member from the underlayment to release the tray from the underlayment.

40. The foldable storage unit of claim 39, wherein the piercing member included is corkscrew-shaped and has an upper end coupled to the gripping means and a lower end formed to include a sharpened point and is helically wound about a vertical axis extending through the central aperture of the base.

41. The foldable storage unit of claim 39, wherein the piercing member has an upper end coupled to the gripping means and a lower end formed to include a sharpened point and the sharpened point is arranged to lie in the central aperture of the base when the piercing member is moved to assume the retracted position and to lie outside of the central aperture of the base when the piercing member is moved to assume the temporary locked position.

\* \* \* \* \*